(12) United States Patent
Holtzhausen

(10) Patent No.: US 7,311,296 B2
(45) Date of Patent: Dec. 25, 2007

(54) CONDUIT THREADING DEVICE AND METHOD

(76) Inventor: John Michael Holtzhausen, 28 Firmount Road, Somerset West, Western State Province (ZA) 7130

( * ) Notice: Subject to any disclaimer, the term of this patent is extended or adjusted under 35 U.S.C. 154(b) by 158 days.

(21) Appl. No.: 10/567,550

(22) PCT Filed: Aug. 9, 2004

(86) PCT No.: PCT/IB2004/002554
§ 371 (c)(1),
(2), (4) Date: Feb. 8, 2006

(87) PCT Pub. No.: WO2005/018067
PCT Pub. Date: Feb. 24, 2005

(65) Prior Publication Data
US 2007/0034844 A1  Feb. 15, 2007

(30) Foreign Application Priority Data
Aug. 13, 2003 (ZA) .................... 2003/6252

(51) Int. Cl.
*E21C 29/16* (2006.01)
(52) U.S. Cl. .............. 254/134.4; 254/134.3 R
(58) Field of Classification Search .......... 254/134.4, 254/134.3 R, 134.3 FT; 184/15.1, 15.2
See application file for complete search history.

(56) References Cited

U.S. PATENT DOCUMENTS

| | | | |
|---|---|---|---|
| 3,793,732 A | 2/1974 | Hamrick | |
| 4,043,537 A | 8/1977 | Russo | |
| 4,953,828 A | 9/1990 | Baldecchi et al. | |
| 5,884,384 A * | 3/1999 | Griffioen | 29/468 |
| 5,946,788 A * | 9/1999 | Griffioen et al. | 29/433 |
| 6,003,842 A * | 12/1999 | Hug | 254/134.3 FT |
| 6,848,541 B2 * | 2/2005 | Griffioen et al. | 184/15.2 |
| 2007/0034844 A1 * | 2/2007 | Holtzhausen | 254/134.4 |

FOREIGN PATENT DOCUMENTS

GB  K10705 A  0/1910

* cited by examiner

Primary Examiner—Lee D. Wilson
(74) Attorney, Agent, or Firm—David A. Guerra

(57) ABSTRACT

A conduit threading device is provided for passing a pull-cord (24) through a conduit (17) by imposing suction at one end of a conduit to draw a shuttle (16) having a zone of maximum diameter that is commensurate with the internal diameter of the conduit and that is introduced at the other end of the conduit, through the conduit. The conduit threading device includes a positive, displacement pump (1), typically a hand operated piston and cylinder pump, having a suction inlet (14) generally at the end of a flexible suction pipe (13) configured for releasable attachment, by way of one of a selection of adapters, to an end of a conduit. Interposed between the pump and suction inlet is a separate collection chamber (9) for waste solids and liquids drawn into the suction inlet during use. The pull-cord is preferably a light weight polypropylene string, or the like.

20 Claims, 3 Drawing Sheets

CONDUIT THREADING DEVICE AND METHOD

FIELD OF THE INVENTION

This invention relates to a conduit threading device and method of using same for introducing an electrical wire or communications cable, or both, into a conduit through which they are to pass utilizing a pull-cord that is introduced into the conduit in preparation therefor. In particular, but not exclusively, the invention relates to a conduit threading device for assisting in threading a pull-cord through a conduit whilst simultaneously, or in advance, serving to safely clear the conduit of any water, debris or the like that may have accumulated in the conduit, typically during the building operations.

It is to be understood that the term pull-cord as used in this specification is intended to refer to any cord or line that is commonly introduced into a conduit firstly and then used in pulling electrical wires, communications cables, or a more robust pull-cord for the latter purpose through the conduit.

BACKGROUND TO THE INVENTION

The threading of pull-cords through conduits in buildings for the purpose of pulling electrical wires and communications cables through the conduits is time consuming and often difficult due to the fact that the conduits may be lengthy and have multiple bends.

The most common method for threading electrical wires or pull-cords through conduits makes use of a long spring steel wire, often referred to in the trade as a fishwire or fishtape, that is manually pushed through a conduit from one end to the other. An electrical wire or communications cable or a plurality thereof may then be secured to the free end of the fishtape that is then pulled back through the conduit in order to pull the electrical wire or communications cable through the conduit. This method is often time consuming and difficult to carry out as the fishwire generally has to be forced around a series of bends of the conduit, sometimes with great resistance, and sometimes without success. The one fishwire may then have to be retrieved from the opposite end of the conduit with a second fish wire.

A wide variety of different devices has been proposed in the prior art that utilise, in most cases, an elevated pressure, typically that of compressed air at high pressure in canisters, but in other cases an elevated or sub-atmospheric pressure created using an electrical blower, most typically, a vacuum cleaner.

Thus, for example, British patent GB 1910 10705 describes the introduction of a pull-cord that has a reel on which the cord is wound and a source of compressed air to blow a dart with an expendable flange through the conduit with one end of the cord attached to its head. This arrangement has the disadvantage that high pressure can build up behind the dart especially if the movement of the dart along the conduit takes place irregularly according to obstructions typically in the form of foreign matter encountered and also bends in the conduit that have to be negotiated; and the general effect can be that dirt, water and other debris can be expelled from the open end of the conduit with some force and velocity thereby creating a safety hazard to property and persons who may be in the vicinity of the open end of the conduit. Also, the unwinding of a cord from a reel is considered by applicant to be inappropriate to the effective implementation of such a method.

Still further, the operator is generally not able to observe the arrival of the pull-cord at its destination, resulting in an undesirable lack of control especially on noisy building sites where communication is often a problem.

A similar high pressure system is proposed in U.S. Pat. No. 4,043,537 to Russo which accordingly has the disadvantages associated with high pressure that are indicated above.

On the other hand, U.S. Pat. No. 5,246,207 to Horii et al; U.S. Pat. No. 5,374,034 to Flores et al; and U.S. Pat. No. 5,730,424 to Flores Snr all propose systems in which there is no plug or dart to carry an end of the cord or line that is simply blown through the conduit utilising elevated fluid pressure that once more has the disadvantages indicated above.

U.S. Pat. No. 3,793,732 to Hamrick discloses a similar arrangement that utilises either the elevated pressure or suction developed by a vacuum cleaner to achieve the same objective. Whilst the positive or negative pressure developed by a vacuum cleaner is unlikely to be sufficiently high to create a danger, the air pressure differential generated is also considered by applicant to be insufficiently high to be effective for the purpose at hand. Once more a reel of cord is employed with attendant disadvantages.

OBJECT OF THE INVENTION

It is an object of this invention to provide a simple, yet highly effective conduit threading device for passing pull-cords through conduits that overcomes, at least to some extent, the difficulties outlined above.

SUMMARY OF THE INVENTION

In accordance with one aspect of this invention there is provided a conduit threading device for passing a pull-cord through a conduit by imposing a negative pressure on a leading end of a shuttle having a zone of maximum diameter that is commensurate with the internal diameter of the conduit and attachment means for the attachment of a pull-cord to the shuttle so that suction applied to a target end of a conduit operatively draws the shuttle and attached pull-cord through the conduit, the conduit threading device being characterised in that it includes a positive displacement pump having a suction inlet configured for releasable attachment to an end of a conduit or conduit fitting and in that there is interposed between the pump and suction inlet a separate collection chamber for solids and liquids drawn into the suction inlet during use.

Further features of this aspect of the invention provide for the positive displacement pump to be a manually operable pump preferably having a vertically movable piston assembly with the pump having a volumetric displacement from 1 to 4 liters (about 2 to about 8½ pints), typically about 2½ to 3 liters (about 5¼ to about 6½ pints) in the case of 20 millimeter (about ¾ inche) and 25 millimeter (about 1 inche) diameter conduits; for a suction outlet from the collection chamber to communicate with a suction inlet to the pump; or both a suction inlet to, and suction outlet from, the collection chamber to both terminate at a position elevated from the bottom of the collection chamber; for the suction outlet from the collection chamber to the pump to have filter means associated with it to prevent dirt becoming entrapped with air drawn into the pump; for the suction inlet to be a free end of a flexible pipe connected at its other end to the collection chamber; and for the conduit threading device to include a selection of different tapered adapters that are preferably transparent for selective cooperation with the suction inlet according to the size and orientation of an open end of a conduit or conduit fitting in relation to which the device is to be used.

Still further features of the invention provide for the device to include a shuttle having an operatively leading and trailing section and wherein the trailing section has said zone of maximum diameter that is commensurate with the internal diameter of the conduit; for the shuttle to comprise a generally bell-shaped, somewhat resiliently flexible substantially non-expansible body; for the shuttle to have a rigid or semi-rigid attachment member running longitudinally through its centre with the attachment means at its operatively trailing end; for the body of the shuttle to resemble a diaphragm manufactured from silicon rubber or other suitable resiliently flexible material; for the attachment member to have an integral generally part-spherical or ellipsoidal guide element at its leading end; and for the pull-cord to comprise a nylon, polypropylene or other suitably strong and light weight string, preferably stored in a coreless roll form for unwinding by withdrawing the string generally axially from the centre of the roll with the string preferably having a weight of about one half to two grams per meter, typically about one gram per meter.

In accordance with a second aspect of the invention there is provided a method of threading a pull-cord through a conduit comprising applying suction to one end of the conduit utilising a conduit threading device as defined above with a shuttle installed at the opposite end of said conduit and having an end of a pull-cord attached thereto.

The pump is conveniently a standard dual action operatively vertically orientated hand pump having both suction and pressure outlets. In such an instance the hand pump generally has a base that an operator can anchor with the feet whilst the piston is raised and lowered in order to create a suction at the suction inlet and simultaneously to create an outflow at the pressure outlet. It is to be noted that the invention also envisages use of the pressure outlet under appropriate circumstances simply for blowing debris from a conduit in the event that it is considered to be necessary and safe, preparatory to installing a pull-cord in the conduit utilising the suction inlet.

It has been found that standard manual pumps of a type commercially available for the purpose of inflating inflatable items such as inflatable furniture, dinghies, boats and rafts operate highly effectively when combined with a suitable collection chamber and other components of the device provided by the invention.

In order that the above and other features of the invention may be more fully understood one embodiment thereof will now be described with reference to the accompanying drawings.

DETAILED DESCRIPTION WITH REFERENCE TO THE DRAWINGS

Figure 3:
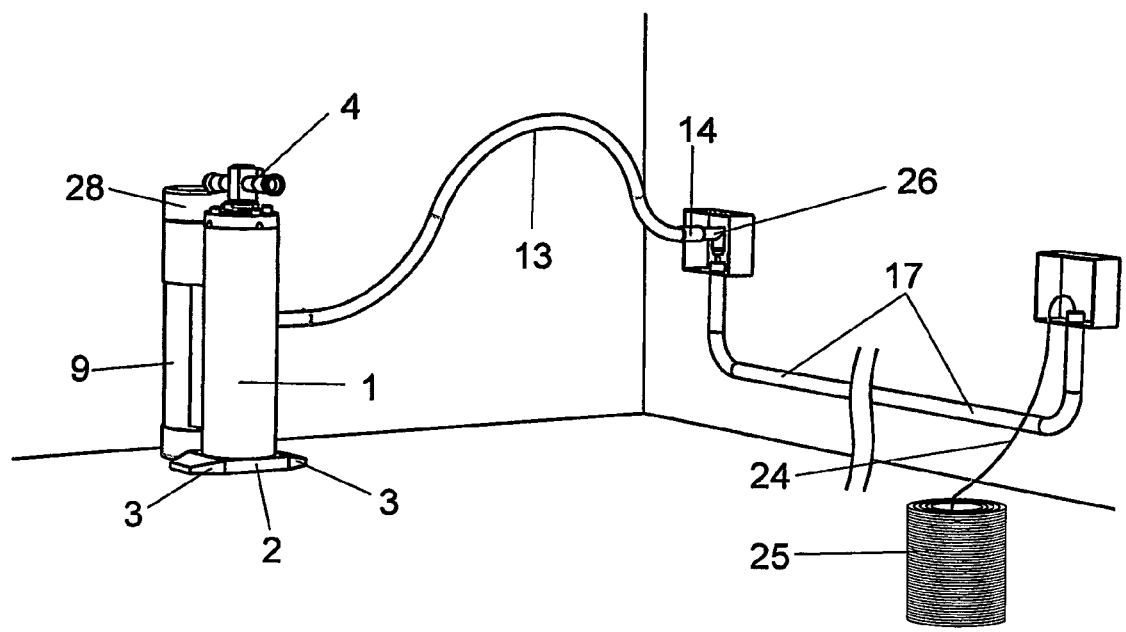
FIG. 3 is an isometric view illustrating the application of the device of this embodiment of the invention.

In the embodiment of the invention illustrated in the drawings, a conduit threading device comprises a manually operable positive displacement pump (1) that extends upwardly from a base (2) that has two lateral extensions (3) (see FIG. 3) adapted for an operator to stand upon in order to operate the pump by way of a transverse handle (4) carried at the operatively upper end of a piston rod (5). The pump is a conventional piston and cylinder type of pump and, in this embodiment of the invention, is a commercially available pump sold for the purpose of inflating and deflating large inflatable items such as inflatable furniture, dinghies, so-called rubber ducks, boats and the like.

Figures 1, 2:
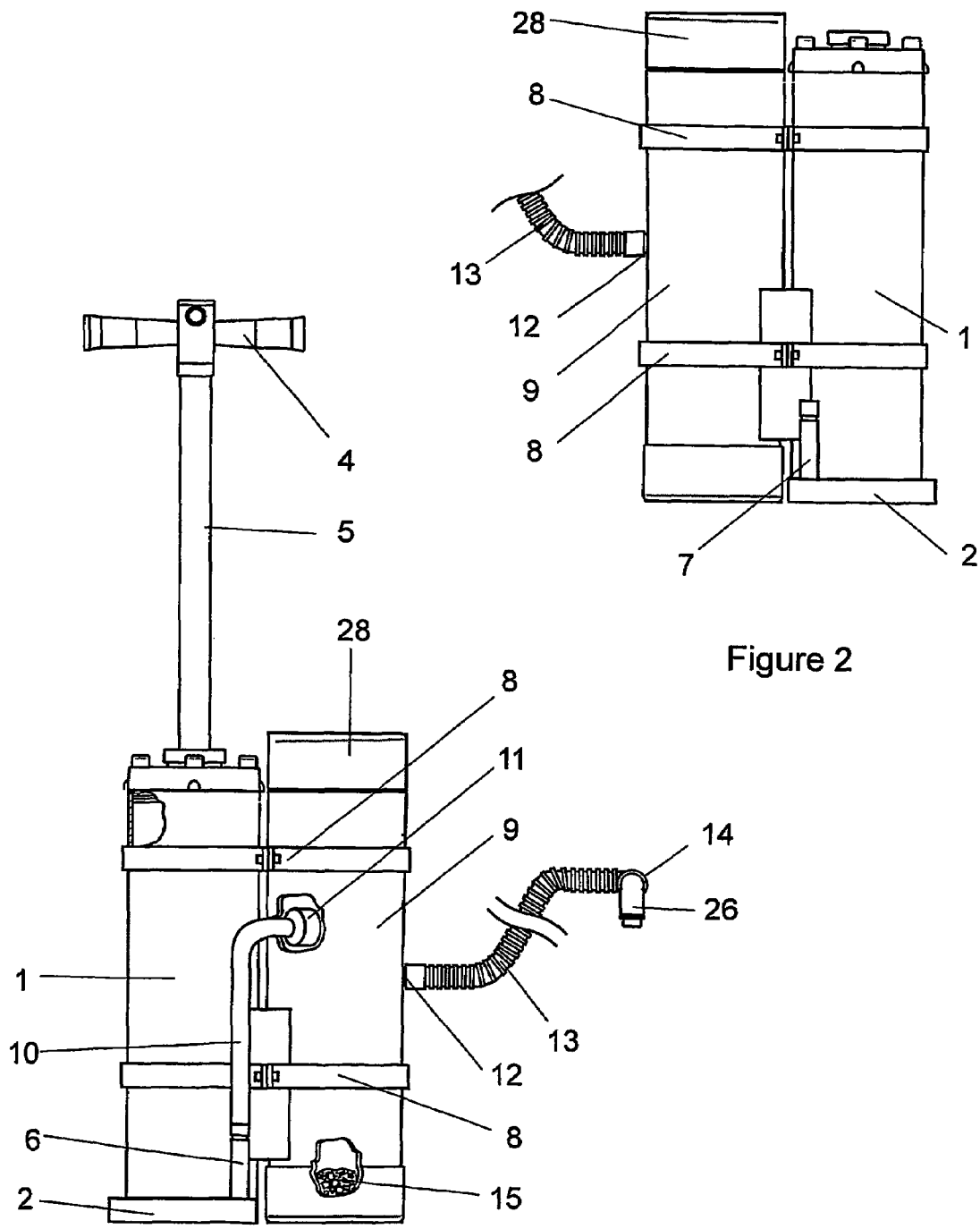
FIG. 1 is a view of one embodiment of pump and collection chamber assembly from one side thereof.
FIG. 2 is a view of the pump and collection chamber assembly from the other side thereof.

The pump has a vacuum inlet connection (6) as shown in FIG. 1 and, on the opposite side, a pressure outlet connection (7), as shown in FIG. 2. The pump, in this case, typically has a displacement capacity of about two to four liters (about 4¼ to about 8½ pints), and, most typically, from two and a half to three liters (about 5¼ to about 6½ pints). This volume represents the volume of about 6 meters (about 20 feet) of 25 millimeter (about 1 inch) diameter conduit and about 12 meters (about 40 feet) of 20 millimeter (about ¾ inch) outside diameter conduit.

Fixed to the pump by means of a pair of vertically spaced horizontally extending bracket assemblies (8) is a similarly dimensioned collection chamber (9) that is positioned laterally offset from the pump, but extending parallel to it. The suction inlet (6) to the pump is connected to the interior of the collection chamber by means of a suction pipe (10). The entrance to the suction pipe is positioned at an elevated position in the collection chamber and has a filter (11) for preventing transfer of any dirt or liquid droplets in the collection chamber to the pump.

Figure 4:
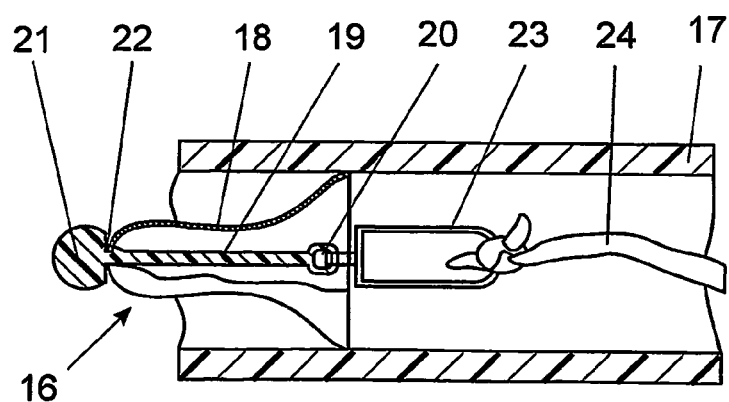
FIG. 4 is a sectional detail of one embodiment of shuttle in situ in a length of conduit.
Figure 5:
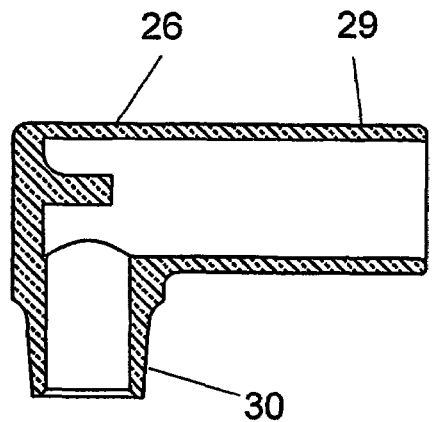
FIG. 5 is a sectional elevation of one form of adapter for applying suction to a conduit under particular circumstances.
Figure 6:
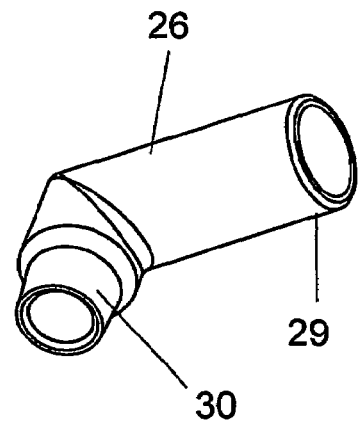
FIG. 6 is a perspective illustration thereof.
Figure 8:
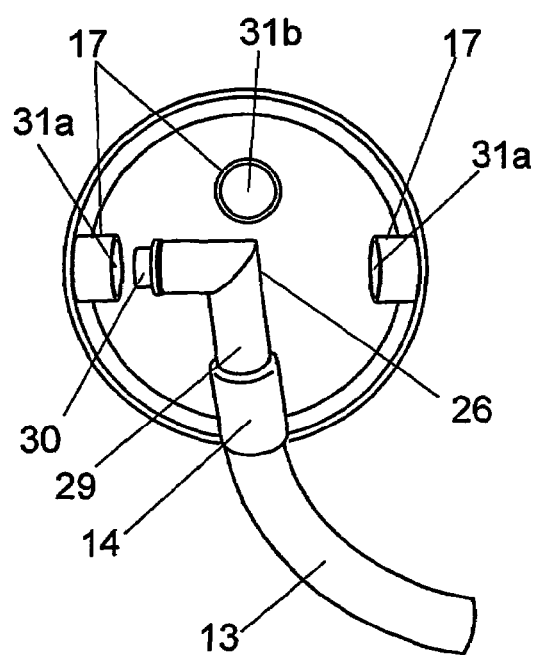

Also in the central region of the collection chamber is a suction inlet (12) to which is removably fitted one end of a flexible suction pipe (13). The other end of the suction pipe has a socket (14) for the selective attachment of adapters to it according to requirements. The arrangement is such that dirt, liquids, and other debris generally indicated by numeral (15) collect in the bottom of the collection chamber for periodic disposal, from time to time. As a separate component of the conduit threading device there is provided a shuttle (16) (see FIG. 4) for introduction into one end of a conduit (17), the shuttle being adapted in use to be drawn by suction to the opposite end of the conduit.

The shuttle (16) is, in this embodiment of the invention, composed of two parts, the first of which is a generally bell-shaped resiliently flexible diaphragm (18) manufactured from silicon rubber or other suitable material that exhibits suitable low friction properties relative to the material from which conduits are made. The maximum diameter of the diaphragm is approximately the same as the internal diameter of a conduit with which it is to be used, and preferably slightly larger. Accordingly, a complete conduit threading device may comprise two or more different sizes of shuttle so as to enable a pull-cord to be installed in a number of different sizes of conduits.

The other component of the shuttle is an axially extending injection moulded attachment member (19) that has an eye

(20) at its trailing end and a generally spherical or ellipsoidal guide element (21) at its leading end. A locating groove (22) for receiving the edge of the leading end of the diaphragm is provided immediately adjacent the trailing end of the guide element. Any suitable attachment means such as a split ring (23) can be attached to the eye of the attachment member so that a free end of a pull-cord (24) can be attached thereto. Of course, one entire shuttle assembly will be provided for each different size of conduit with which the conduit threading device is to be used.

The pull-cord is preferably a rather lightweight element and most conveniently is a plastics string, such as a polypropylene string, that is generally supplied in coreless rolls (25) thereof from which the string is designed to be withdrawn with substantially no resistance from the centre of the roll by a sort of unravelling process in well-known manner. Indeed, in order to avoid any difficulties that may be created by rewinding pull-cords as in prior art situations, it is proposed that, in view of the extremely low cost of such a polypropylene string, the string be regarded as disposable or, at least, not reusable for this particular purpose. By continuously withdrawing string of this nature from its original roll form, substantially no resistance will be experienced in withdrawing string as required.

Figure 7:
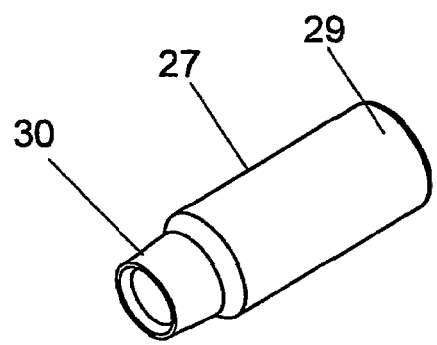
FIG. 7 is a perspective illustration of one alternative form of adapter for application in other circumstances; and, FIG. 8 is an illustration showing the different circumstances in which different adapters are appropriate.

Finally, and referring now to FIGS. 5 to 8 of the drawings, the adapters to be selectively used on the suction end of the socket (14) of the suction pipe (13) may be of basically two different types, namely those (26) embodying a right angle (see FIGS. 5, 6 and 8), and those (27) that are straight (see FIG. 7). Each of a right angled adapter and a straight adapter are provided for each cross-sectional size of conduit with which the device is to be used and all of the adapters and, for that matter shuttles, are conveniently stored in a storage unit indicated by numeral (28) carried at the operatively upper end of the collection chamber.

Each adapter has a connection end (29) for releasable cooperation with the socket (14) of the suction pipe and a spigot (30) at the other end that is preferably tapered to ensure a tight fit in an open end (31) on a conduit. Clearly, the right angled adapters are for use in coupling the suction pipe to conduits that extend in a plane parallel to that of a supporting wall, as indicated by numeral (31a), and the straight adapters are for use in coupling the suction pipe to conduits (31b) that extend at right angles to the relevant wall.

Preferably the adapters are all made of injection moulded plastics material and are transparent so that the arrival of the shuttle, that is typically coloured a bright colour such as bright orange, can be observed through the wall of the adapter by the operator.

It will be clear to those skilled in the art that, in use, an appropriate adapter is attached to the socket (14) of the suction pipe (13) and the adapter is engaged in the appropriate end of the relevant conduit. The shuttle has attached to the split ring (23) the free end of a polypropylene string (24) of the type described above and the shuttle is located in the opposite end of the conduit.

Application of a suction to the conduit by operating the pump will cause the shuttle to move into the conduit and, depending on the length of the conduit, a number of strokes of the pump may be required to draw the shuttle through to the end of the conduit in which the adapter is engaged. The arrival of the shuttle at that end will be observed through the wall of the relevant adapter. During this procedure, the string will be drawn freely off the roll thereof as indicated above and become threaded through the conduit.

It has been found that the device described above operates extremely effectively in practice and that little or no maintenance is required, apart from periodic removal of accumulated debris from the collection chamber.

As indicated above, it is also possible, according to circumstances, and in the event that appreciable debris and possibly water are present in a conduit, that it is desirable to blow the debris and water out. This can be achieved simply by disengaging the suction pipe (13) from the collection chamber and engaging it with the pressure outlet connection (7) from the pump. The suction pipe can then be connected to a conduit by means of an appropriate adapter and air can be pumped under pressure through the conduit in order to clear it or, simply for the purpose of identifying the other end of a conduit. Following this operation, the shuttle can be drawn through the conduit and the suction in the manner described above.

It will be understood that numerous variations may be made to the embodiment of the invention described above without departing from the scope hereof. Indeed there are many aspects of the invention that can be varied and, in particular, the design of the shuttle can be varied widely; the nature of the positive displacement pump can be varied widely; and the configuration of the collection chamber can be varied according to requirements.

The invention claimed is:

1. A conduit threading system for passing a pull-cord through a conduit by imposing suction at one end of the conduit, said conduit threading system comprising:
 a pull-cord;
 a shuttle having a zone of maximum diameter corresponding to the internal diameter of the conduit and adapted to be received within the conduit, said shuttle being removably attachable to an end of said pull-cord;
 a positive displacement pump having a suction inlet;
 a collection chamber attached to said suction inlet of said positive displacement pump; and
 a suction pipe releasably attachable to said collection chamber and the conduit.

2. The conduit threading system as set forth in claim 1, wherein said positive displacement pump is a manually operable pump having a vertically movable piston and cylinder assembly.

3. The conduit threading system as set forth in claim 2, wherein said positive displacement pump further comprising two lateral extensions adapted for an operator to stand upon in order to operate said pump by way of a transverse handle carried at the operatively upper end of said piston rod.

4. The conduit threading system as set forth in claim 2, wherein said positive displacement pump has a volumetric displacement of from 1 to 4 liters (about 2 to about 8 pints).

5. The conduit threading system as set forth in claim 1, wherein said collection chamber further comprising a suction outlet and a suction inlet, said suction outlet of said collection chamber being releasably attachable to said suction inlet of said pump, said suction inlet of said collection chamber being removably attachable to said suction pipe, said suction inlet and suction outlet of said collection chamber both terminate at a position elevated from the bottom of said collection chamber.

6. The conduit threading system as set forth in claim 5, wherein said suction outlet of said collection chamber further comprising a filter means for preventing debris becoming entrapped with air drawn into said pump.

7. The conduit threading system as set forth in claim 1 further comprising a plurality of adapters releasably attachable to the free end of said suction pipe, each of said adapters having a different outer diameter.

8. The conduit threading system as set forth in claim 7 further comprising a storage unit removably attachable to the upper section of said collection chamber, said storage unit being adapted to receive said adapters.

9. The conduit threading system as set forth in claim 1, wherein said shuttle having a generally bell-shaped resiliently flexible diaphragm, and an axially extending attachment member, said diaphragm having a leading end and a trailing end, said trailing end of said attachment member having a maximum diameter corresponding to the internal diameter of the conduit, said attachment member having an eye located at its trailing end and a generally spherical guide element located at its leading end, said eye being removably attachable to said pull-cord through an attachment means.

10. The conduit threading system as set forth in claim 9, wherein said attachment member further comprising a groove adapted to receive an edge of said leading end of said diaphragm, said groove being located adjacent said guide element.

11. The conduit threading system as set forth in claim 1, wherein said pull-cord being stored in a roll form for unwinding by withdrawing said pull-cord generally axially from the center of the roll with said pull-cord having a weight of about one half to two grams per meter, and where said pull-cord is selected from the group consisting of a nylon string, a polypropylene string.

12. A conduit threading system comprising:
a pull-cord;
an attachment means removably attachable to said pull-cord;
a shuttle having a generally bell-shaped resiliently flexible diaphragm, and an axially extending attachment member, said diaphragm having a leading end and a trailing end, said trailing end of said attachment member having a maximum diameter corresponding to the internal diameter of the conduit, said attachment member having an eye located at its trailing end and a generally spherical guide element located at its leading end, said eye being removably attachable to said attachment means;
a positive displacement pump having a suction inlet;
a collection chamber having a suction outlet and a suction inlet, said suction outlet of said collection chamber being attached to said suction inlet of said positive displacement pump, said suction inlet and suction outlet of said collection chamber both terminate at a position elevated from the bottom of said collection chamber;
a suction pipe releasably attachable to said suction inlet of said collection chamber; and
an adapter removably attachable to the free end of said suction pipe, the free end of said adapter being receivable in said conduit.

13. The conduit threading system as set forth in claim 12, wherein said positive displacement pump is a manually operable pump having a vertically movable piston and cylinder assembly.

14. The conduit threading system as set forth in claim 13, wherein said positive displacement pump further comprising two lateral extensions adapted for an operator to stand upon in order to operate said pump by way of a transverse handle carried at the operatively upper end of said piston rod.

15. The conduit threading system as set forth in claim 12, wherein said suction outlet of said collection chamber further comprising a filter means for preventing debris becoming entrapped with air drawn into said pump.

16. The conduit threading system as set forth in claim 12, wherein said attachment member further comprising a groove adapted to receive an edge of said leading end of said diaphragm, said groove being located adjacent said guide element.

17. The conduit threading system as set forth in claim 12, wherein said pull-cord being stored in a roll form for unwinding by withdrawing said pull-cord generally axially from the center of the roll with said pull-cord having a weight of about one half to two grams per meter, and where said pull-cord is selected from the group consisting of a nylon or polypropylene string.

18. The conduit threading system as set forth in claim 12 further comprising a storage unit removably attachable to the upper section of said collection chamber, said storage unit being adapted to receive said adapter.

19. The conduit threading system as set forth in claim 12, wherein said adapter having a connection end and a spigot, said connection end being releasably attachable with a socket located at the free end of said suction pipe, said spigot being located opposite of said connection end and being tapered.

20. A method of passing a pull-cord through a conduit, said method comprising the steps of:
a step of providing an apparatus, said apparatus comprising a pull-cord; a shuttle having a zone of maximum diameter corresponding to the internal diameter of the conduit and adapted to be received within the conduit, said shuttle being removably attachable to an end of said pull-cord; a positive displacement pump having a suction inlet; a collection chamber releasably attachable said suction inlet of said positive displacement pump; a suction pipe attached to said collection chamber; and an adapter removably attachable to the free end of said suction pipe;
introducing the free end of said adapter into the conduit;
attaching said shuttle to a free end of said pull-cord;
introducing said shuttle into the conduit opposite said adapter with the end opposite of said pull-cord attachment being introduced first;
attaching the free end of said suction pipe to said collection chamber;
attaching said suction inlet of said positive displacement pump to said collection chamber; and
operating said positive displacement pump until said shuttle reaches said adapter.

* * * * *